(12) United States Patent
Fakhari

(10) Patent No.: US 10,334,792 B2
(45) Date of Patent: Jul. 2, 2019

(54) COMPOSITE PLANT CAGE WITH LOCKING CLIPS

(71) Applicant: ALF Operating Partners, Ltd., Fort Worth, TX (US)

(72) Inventor: M. John Fakhari, Fort Worth, TX (US)

(73) Assignee: ALF Operating Partners, Ltd., Fort Worth, TX (US)

( * ) Notice: Subject to any disclaimer, the term of this patent is extended or adjusted under 35 U.S.C. 154(b) by 408 days.

(21) Appl. No.: 15/206,398

(22) Filed: Jul. 11, 2016

(65) Prior Publication Data

US 2018/0007843 A1    Jan. 11, 2018

(51) Int. Cl.
*A01G 9/12* (2006.01)

(52) U.S. Cl.
CPC ....................... *A01G 9/12* (2013.01)

(58) Field of Classification Search
CPC ........................................................ A01G 9/12
See application file for complete search history.

(56) References Cited

U.S. PATENT DOCUMENTS

| | | | | |
|---|---|---|---|---|
| 499,568 A * | 6/1893 | Nowotny | ................ | F21V 35/00 431/295 |
| 977,704 A * | 12/1910 | Brownlee | ................ | E04C 5/167 24/457 |
| 3,788,025 A * | 1/1974 | Holmes | .................. | E04C 5/168 52/685 |
| 4,110,951 A * | 9/1978 | Padrun | .................... | E04C 5/168 403/395 |
| 4,309,120 A * | 1/1982 | Werthmann | ............ | F16B 2/246 16/DIG. 25 |
| 5,258,423 A * | 11/1993 | Crabb | .................... | A61L 2/0035 523/136 |
| 5,697,591 A * | 12/1997 | Cooper | .................... | F21V 21/08 248/229.16 |
| 5,937,604 A * | 8/1999 | Bowron | ................ | E04G 21/185 248/229.16 |
| 6,009,680 A | 1/2000 | Mathews | | |
| 6,394,285 B1 * | 5/2002 | Arthurs | ................. | A47L 15/505 211/41.9 |
| 6,622,352 B2 * | 9/2003 | Herron | .................... | A01G 17/08 24/336 |
| 7,178,776 B2 | 2/2007 | Buck et al. | | |
| 7,188,448 B2 | 3/2007 | Sedlacek | | |
| 7,296,699 B2 * | 11/2007 | Hung | .................... | A47B 47/005 211/182 |

(Continued)

*Primary Examiner* — Jeanette E Chapman
(74) *Attorney, Agent, or Firm* — Erickson Kernell IP, LLC; Kent R. Erickson

(57) ABSTRACT

A plant cage for supporting growing plants includes horizontal and vertical support rods connected by locking clips to form a cage of a desired size and shape. The locking clip includes a clamp at each end of an elongated body, with each clamp formed of two tabs extending outwardly at oblique angles, with an aperture formed in each tab for receiving a horizontal or vertical support rod. The outwardly extending tabs are resilient and flexible such that the tabs can be moved towards each other to a deflected position so that the apertures align and a support rod can be inserted, the resiliency of the material then biases the tabs away from each other when released so that the apertures become unaligned so that the inserted rod is frictionally captured by the clamp.

16 Claims, 5 Drawing Sheets

(56) References Cited

U.S. PATENT DOCUMENTS

| | | | |
|---|---|---|---|
| 7,469,515 B2* | 12/2008 | Minor | E04C 5/167 |
| | | | 403/397 |
| 7,533,854 B2* | 5/2009 | Aube | A61M 5/1417 |
| | | | 248/218.4 |
| 7,810,276 B2* | 10/2010 | Rosaen | A01G 9/128 |
| | | | 47/33 |
| 8,099,925 B1* | 1/2012 | Coons | E04C 5/20 |
| | | | 248/346.04 |
| 8,776,328 B2* | 7/2014 | Kodi | E04C 5/163 |
| | | | 24/339 |
| 2004/0068925 A1 | 4/2004 | Puspurs | |
| 2006/0248844 A1* | 11/2006 | Kodi | E04C 5/163 |
| | | | 52/712 |
| 2009/0120030 A1* | 5/2009 | Garza | E04C 5/20 |
| | | | 52/686 |
| 2012/0186149 A1 | 7/2012 | Dray | |
| 2013/0269246 A1 | 10/2013 | Kassouni | |
| 2014/0109474 A1 | 4/2014 | Reed, Jr. | |
| 2015/0068117 A1 | 3/2015 | Savino | |
| 2015/0289454 A1 | 10/2015 | Legus et al. | |
| 2017/0261019 A1* | 9/2017 | Johnson | F16B 7/0493 |

\* cited by examiner

COMPOSITE PLANT CAGE WITH LOCKING CLIPS

BACKGROUND OF THE INVENTION

Field of the Invention

The present invention relates generally to supports for plants. More specifically, the invention relates to a plant cage formed from a fiber reinforced composite material and having locking clips interconnecting a plurality of horizontal supports to vertical posts.

Background & Description of the Related Art

Various types of devices are commonly used in gardening to provide support surfaces for the branches and stems of growing plants and to contain plants to a particular area. For example, trellises are often used to support decorative vine plants, such as ivy, while plant cages are commonly used in vegetable gardens to provide support to plant branches bearing heavy fruit or vegetables.

Tomato cages are ubiquitous in residential vegetable gardens, with cages of varying materials, shapes, and sizes available depending on the type of plant and size of garden. Two common types of tomato cages include a round cage comprising two or more concentric, horizontally-oriented rings connected to three or more support rods, and a rectangular cage comprising two or more horizontally-oriented rectangular supports connected to four or more generally vertical support rods. Variations on the configurations of the tomato cages abound, with some round cages having rings of increasing diameter attached to obliquely oriented support rods, while some rectangular cages include diagonal struts that provide reinforcement to the rectangular supports.

The components of many common tomato cages are made of steel, with the supports welded or soldered to the support rods. Such construction is prone to failure as the steel is quickly subject to corrosion and rust as the cage is constantly exposed to the elements. It is common for such cages to fail at the weld points after less than one season of use. Tomato cages formed from plastic material, such as polyvinyl chloride (PVC) are also widely used, with horizontal supports clipped to vertical rods to form triangular, rectangular, or cages of other shapes.

While plastic or PVC cages avoid the rust and deterioration problems common to steel cages, they have their own shortcomings. For example, the clips used to attach the horizontal supports to the vertical rods are typically "C" shaped clips formed by two oppositely curved fingers extending from the end of the horizontal support. With a horizontally oriented "C" clip positioned at each end of the horizontal support, the clips snap around the circumference of a corresponding vertical rod to secure the horizontal support in place. The integrity of the snap connection, however, relies entirely on the spring tension of the extending curved fingers and the frictional resistance between the clip and the vertical rod. Thus, the clip can be moved with relative ease along the vertical rod. That ease of movement often results in unwanted movement of the horizontal support when, for example under the load of a weighted branch of a plant. Furthermore, because the clips at each end of the horizontal support are similarly oriented, when one clip moves it tends to move the entire support, pulling the clip at the opposite end along.

Thus, it can be seen that there is a need in the art for a plant cage that does not easily deteriorate upon exposure to the elements, yet provides secure connection between horizontal supports and vertical rods so that the cage retains its shape and configuration under load.

SUMMARY OF THE INVENTION

The present invention is directed to a plant cage manufactured from a fiber reinforced composite, and having horizontal and vertical supports joined by locking clips with each locking clip having two clamps in orthogonal orientation to each other.

In various exemplary embodiments, the plant cage includes a plurality of horizontal supports and a plurality of vertical rods, with each end of a horizontal support attached to a proximate vertical rod via the locking clip to form a cage of a desired size and shape.

The clamps at each end of the locking clip body each comprise two tabs extending outwardly at oblique angles, forming a generally "V" shaped projection, with each tab having an aperture formed there through. The outwardly extending tabs are resilient and flexible such that the tabs can be moved towards each other, for example by a user grasping the two tabs simultaneously between a thumb and finger and pinching the two together, so that the tabs move towards each other. When released, the resiliency of the material causes the tabs to spring back to their original positions at oblique angles to each other.

With the tabs positioned in close proximity (i.e., pinched together) the apertures in the two tabs align concentrically and in generally parallel planes such that a horizontal support tube or vertical rod can be inserted into and through the aligned apertures with the inserted tube or rod generally perpendicular to the planar orientation of the apertures.

When the tabs are released with a tube or rod inserted, the tabs spring back towards their original positions, away from and at oblique angles to each other, such that the apertures are not aligned and parallel to each other, but are skewed from perpendicular with the inserted tube or rod. With the aperture in the tab skewed against the tube or rod, the edges of the tab surrounding the aperture frictionally engage the tube or rod to securely hold the clamp in position. Because the two tabs forming the clamp extend at opposite oblique angles to each other, each tab and corresponding aperture independently secures the inserted tube or rod at the desired position, effectively locking the tube or rod in place.

In other exemplary embodiments, the horizontal supports and vertical rods are of differing lengths and diameters, so that a plant cage can be configured in various sizes and shapes as desired.

DETAILED DESCRIPTION OF EXEMPLARY EMBODIMENTS

Various embodiments of the present invention are disclosed herein, it is to be understood that the disclosed embodiments are merely exemplary of the invention, which may be embodied in various forms. Thus, any specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology used in the following description is for convenience in reference only and is not limiting. For example, the words "vertically", "horizontally", "vertical", "horizontal" and "upwardly", "downwardly", "upper", "lower" all refer to the installed position of the item to which the reference is made. The words "inwardly" and "outwardly" refer to directions toward and away from, respectively, the geometric center of the embodiment being designated and parts thereof. The terminology used herein may include the words specifically mentioned, derivatives thereof and words of a similar import. It is further understood that terminology such as the aforementioned directional phrases may be used to describe exemplary embodiments of the plant cage as shown in the figures herein, specifically with a series of vertical rods interconnected to horizontal supports via locking clips to form generally square tower plant cage. This is for convenience only as it is understood that the exemplary embodiments of the plant cage described may of varying size and shape, and that the supports and rods may be positioned at angles other than specifically horizontal or vertical.

Figure 1:
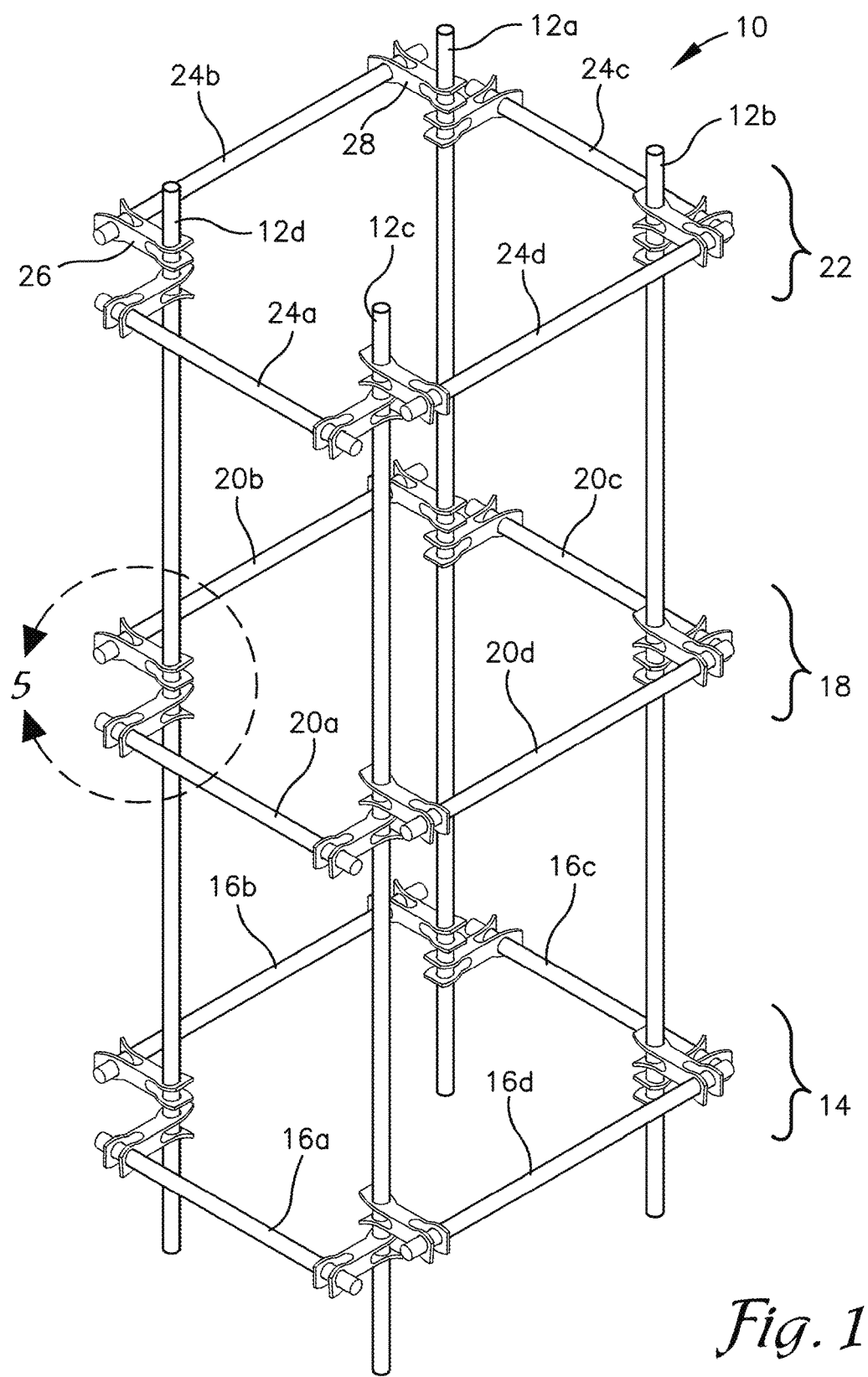
FIG. 1 is a perspective view of a plant cage having horizontal supports and vertical rods interconnected with locking clips in accordance with an exemplary embodiment of the present invention, showing an exemplary configuration in which the rods and locking clips can be assembled.

Looking first to FIG. 1, a plant cage in accordance with an exemplary configuration in which the rods and locking clips of the present invention can be assembled is referenced generally by the numeral 10. The plant cage 10 configured as shown has been assembled as a generally square-shaped tower, with three support tiers 14, 18, 22 arranged from the bottom to the top of the tower. The configuration shown comprises four cylindrical vertical support rods 12a, 12b, 12c, 12d, positioned and oriented to define the outer corners of the cage. The three generally square support tiers 14, 18, 22 are formed by twelve cylindrical horizontal support rods 16, 20, 24 of approximately equal length extending between the corner vertical support rods, with four rods used to form each tier. Thus, lower tier 14 comprises horizontal support rods 16a, 16b, 16c, 16d, middle tier 18 comprises horizontal support rods 20a, 20b, 20c, 20d, and upper tier 22 comprises horizontal support rods 24a, 24b, 24c, 24d.

Looking still to FIG. 1, twenty-four identical locking clips connect the ends of the horizontal support rods 16, 20, 24 to the corresponding adjacent vertical support rods 12. Thus, as shown in the figure, locking clip 26 connects an end of horizontal support rod 24b to vertical support rod 12d, while an identical locking clip 28 at the opposite end of horizontal support rod 24b connects the opposite end of horizontal support rod 24b to vertical support rod 12a. That same arrangement of a locking clip at each end of each horizontal support rod 16, 20, 24 attached to the proximate vertical support rod 12 repeats throughout the plant cage structure. With the clips attached to the horizontal support rods and corresponding vertical support rods, the cage as shown in FIG. 1 is formed. It should be understood that while in the configuration of a plant cage depicted in FIG. 1 that the horizontal support rods are arranged in a square shape, at ninety-degree angles, the locking clips of the present invention allow the horizontal support rods to be arranged at virtually any angle to each other. For example, each tier 14, 18, 22 could be triangular, pentagonal, or other shape with the locking clip allowing placement of adjacent horizontal supports at a desired angle.

Figure 2:
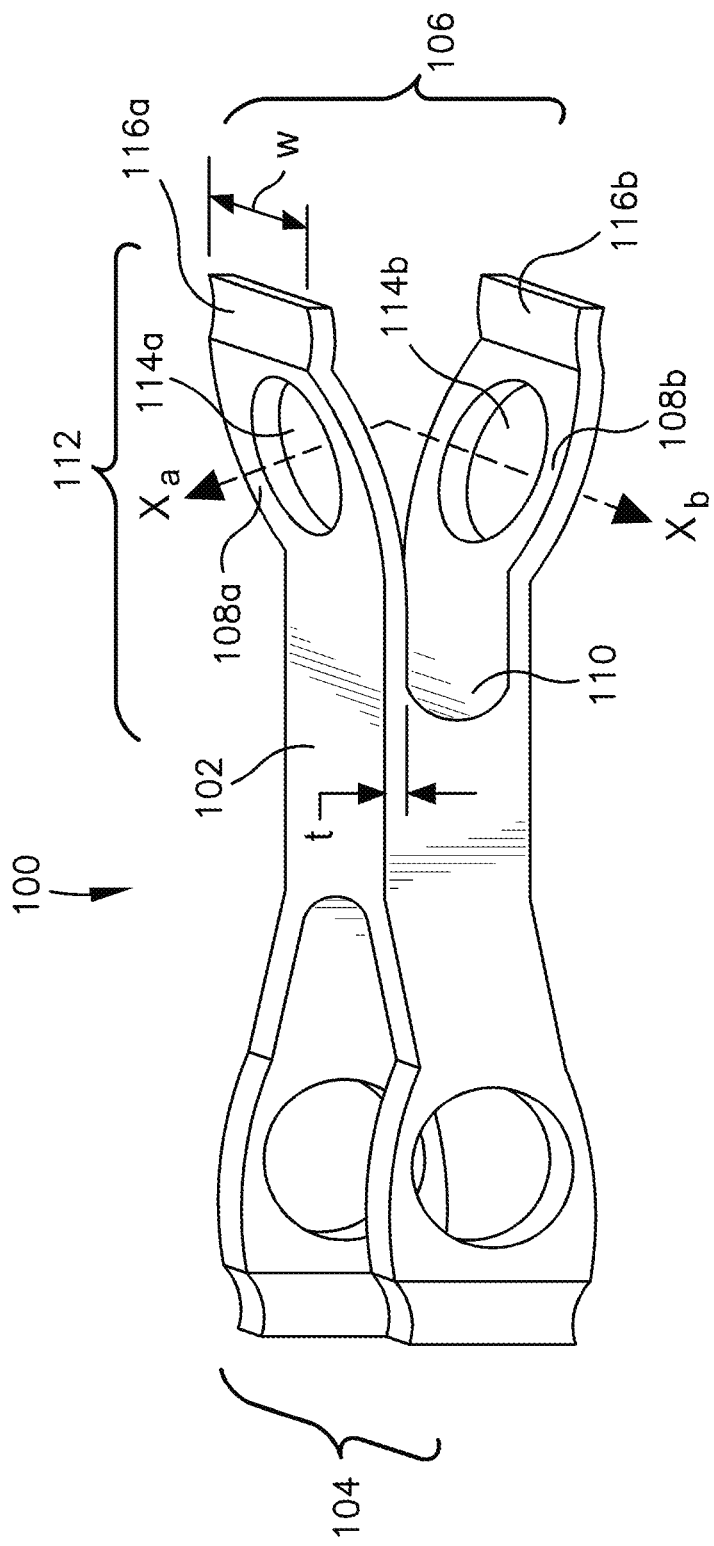
FIG. 2 is a close up perspective view of a locking clip of the plant cage of FIG. 1.

Looking to FIG. 2, a locking clip in accordance with an exemplary embodiment of the present invention, and as identified as one of a plurality of identical locking clips 26, 28 with respect to FIG. 1, is depicted generally by the numeral 100. Locking clip 100 comprises an elongated body 102 with a clamp portion 104, 106 positioned at opposite ends of the body. The two clamp portions 104, 106 are essentially identical in structural configuration but are oriented in orthogonal relationship on opposite ends of the body 102 such that clamp 106 is rotated ninety degrees with respect to clamp 104.

Clamp 106 comprises a pair of tabs 108a, 108b extending outwardly from the body 102 at oblique angles. A U-shaped channel 110 is defined at the junction between tabs 108a and 108b and the body 102, with the tabs 108a, 108b flaring outwardly at oblique angles away from each other at their distal ends, with the two projecting tabs thus forming an overall "V" shaped extension portion 110.

As seen in the figure, the thickness t of each tab 108 remains essentially constant along the length of the projecting tab, while the width w of the tab increases toward the distal end. Thus, the tab is 108 narrower at the juncture with body 102, and wider at the portion where an aperture 114 is formed, near the distal end. The relative thinness of the projecting tabs 108 allow each tab to be deflected from its natural resting positions shown in the figure and towards the complementary tab. A semicircular detent portion 116a, 116b formed at the distal end of each tab provides a gripping area allowing a user to grasp the two tabs (e.g., between a thumb and a forefinger) and squeeze to deflect the tabs toward each other. Upon release, the resiliency of the locking clip material causes the tabs to spring back to their original, undeflected, positions.

Figure 3:
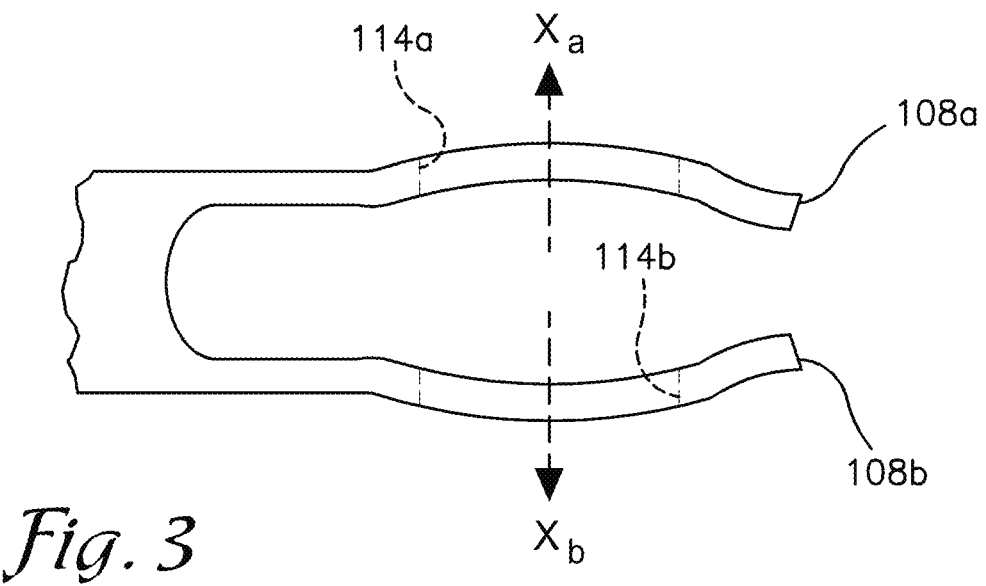
FIG. 3 is a fragmentary, close-up side view of a portion of the locking clip of FIG. 2 with the tabs deflected towards each other.

Circular apertures 114a and 114b are formed through each respective tab 108a and 108b, the aperture positioned towards the distal end of the corresponding tab. With the tabs 108 in their normal, released position as shown in the figure (i.e., a user is not squeezing the tabs so as to deflect them towards each other) the axis $x_a$, $x_b$ of each aperture 114 is generally perpendicular to the surface of the portion of the tab 108 in which it is formed, such that the apertures are at oblique angles to each other, corresponding to the oblique arrangement of the tabs 108a, 108b themselves, as previously described With the tabs 108a, 108b positioned in close proximity (i.e., pinched together towards each other) the apertures 114a, 114b in the respective tabs 108a, 108b align concentrically and in generally parallel planes such that a horizontal support tube or vertical rod can be inserted into and through the aligned apertures with the inserted tube or rod generally perpendicular to the planar orientation of the apertures. Thus, as seen in FIG. 3, in use, when a user squeezes the two tabs 108a, 108b together (e.g., between a thumb and finger) the tabs deflect towards each other so that the apertures 114a, 114b in the two respective tabs 108a, 108b align concentrically, as indicated in the figure by the alignment of the two axes $x_a$, $x_b$ of the respective tabs.

With the tabs 108 thus deflected towards each other and the apertures 114 aligned, it should be apparent that a cylindrical tube or rod having a diameter smaller than the diameter of the apertures 114 can be inserted into and through the aligned pair of apertures 114. It should also be seen that when the tabs 108 are released with a tube or rod thus inserted, the resiliency of the material causes the tabs towards spring back towards their original, non-deflected positions, away from and at oblique angles to each other.

Figure 4:
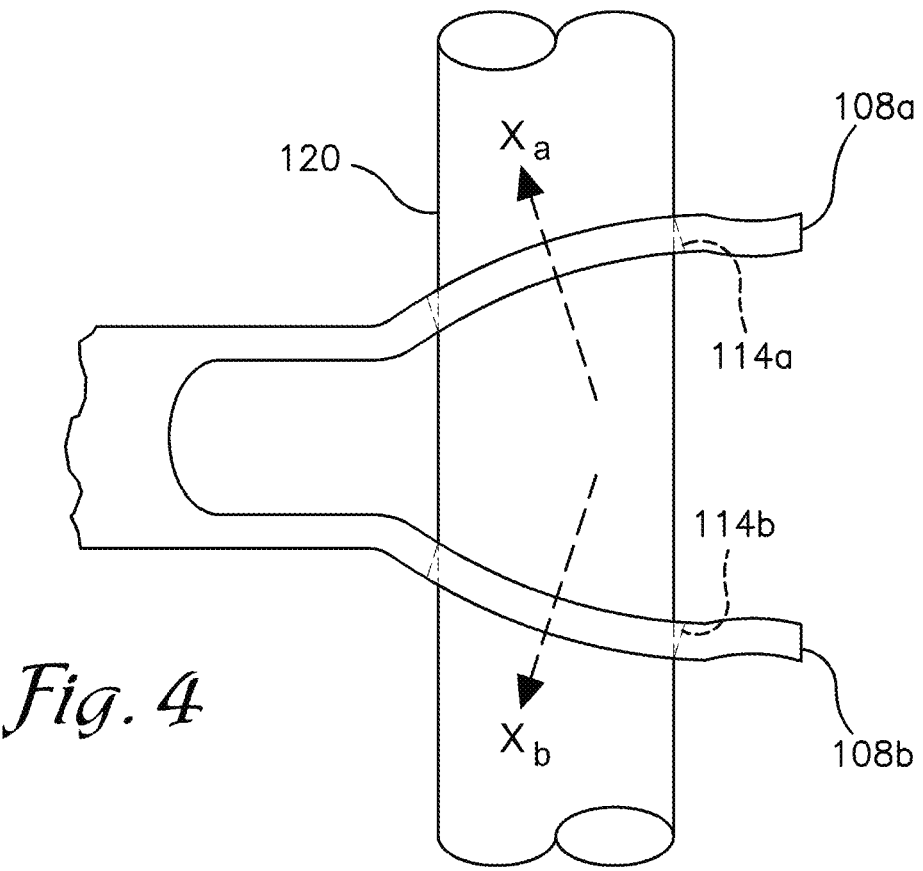
FIG. 4 is a fragmentary, close-up side view of a portion of the locking clip of FIG. 2 with a rod inserted into the apertures and the tabs released.
Figure 5:
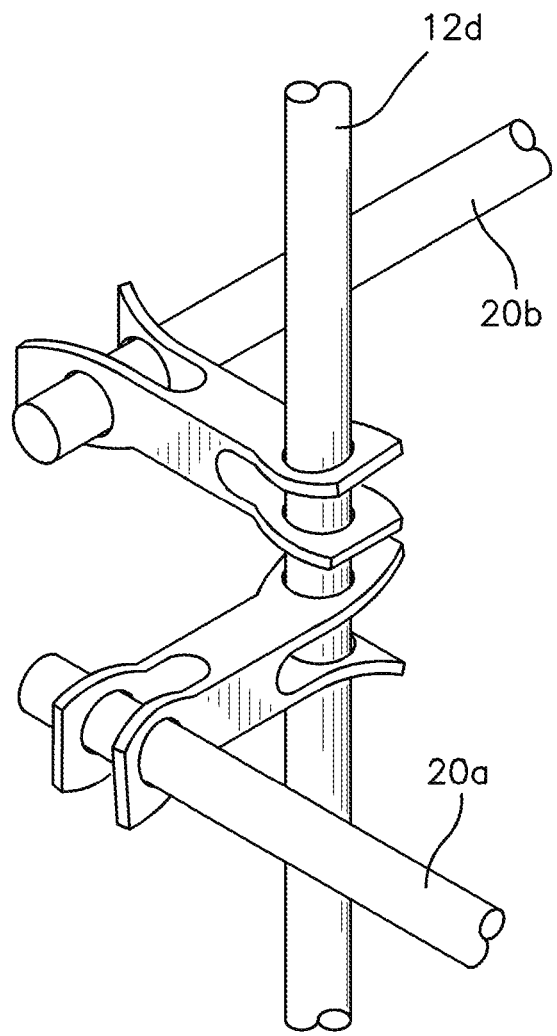
FIG. 5 is a close-up perspective view of a portion of the plant cage of FIG. 1.

As seen in the close-up view of FIG. 4, with a tube 120 inserted into and through the pair of apertures 114 and the tabs released, the tabs 108 return towards their original positions, inhibited from fully returning to that position by the inserted tube 120 or rod. Thus, the apertures 114 are positioned such that they are not aligned axially with the inserted tube 120, but are skewed. Thus skewed, the edges of the tabs 108 surrounding the apertures 114 frictionally engage against the tube 120 to securely hold the clamp in position against the tube 120 and to prevent the tube 120 from sliding up or down within the apertures 114. Furthermore, because the two tabs 108a, 108b forming the clamp extend at opposite oblique angles to each other, each tab 108 and corresponding aperture 114 independently and oppositely secure the inserted tube 114 at the desired position, effectively locking the tube 120 in place.

The vertical and horizontal support rods are preferably cylindrical in shape and formed from a rigid, durable material. Preferably, the rods and supports are constructed of a composite material having properties that resist deterioration when exposed to moisture, temperature extremes, and sunlight, such as a glass fiber reinforced thermosetting resin or polymer (FRP), sometimes referred to as fiberglass. Most preferably, the rods and supports are formed using a pultrusion process in which reinforcing fibers or matting are pulled through a vat of resin and then through a heated die where the resin is cured or set. The pultrusion process permits the rods to be fabricated to any desired length by cutting as it is being pultruded Similarly, the locking clip is preferably made from a durable, weather resistant material such as FRP or other composite material, or from a plastic material such as polyvinyl chloride (PVC). Preferably the locking clip is formed by molding the material into the desired configuration comprising a body with tabs extending from each end. Most preferably, the circular apertures in the extending tabs are formed in molding the locking clip, alternatively the apertures may be drilled or cut separately from the molding process.

Other alternative embodiments of the horizontal and vertical support rods and the locking clip than those specifically depicted are within the scope of the present invention. For example, the support rods may be shaped other than cylindrical, and may be square, rectangular, triangular, or other shaped rods in which case the apertures in the tabs of the locking clip would be correspondingly shaped. It is also foreseen that the horizontal and vertical support rods can be formed using other materials or means, such as by injection molding using a thermoplastic material Turning to FIG. 6, an alternative configuration of a plant cage in which the rods and locking clips of the present invention can be assembled is referenced generally by the numeral 200. In this embodiment, the rods and locking clips are arranged to form a plant cage configured as a triangular-shaped tower, with three support tiers 214, 218, 222 arranged from the bottom to the top of the tower. The plant cage comprises three cylindrical vertical support rods 212a, 212b, 212c positioned to define the outer corners of the cage. The three support tiers 214, 218, 222 are formed by nine cylindrical horizontal support rods of approximately equal length extending between each corner, with three rods used to form each tier. Thus, lower tier 214 comprises horizontal support rods 216a, 216b, 216c, middle tier 218 comprises horizontal support rods 220a, 220b, 220c, and upper tier 222 comprises horizontal support rods 224a, 224b, 224c. Eighteen identical locking clips as previously described connect the ends of the horizontal support rods to the corresponding adjacent vertical support rod.

Figure 6:
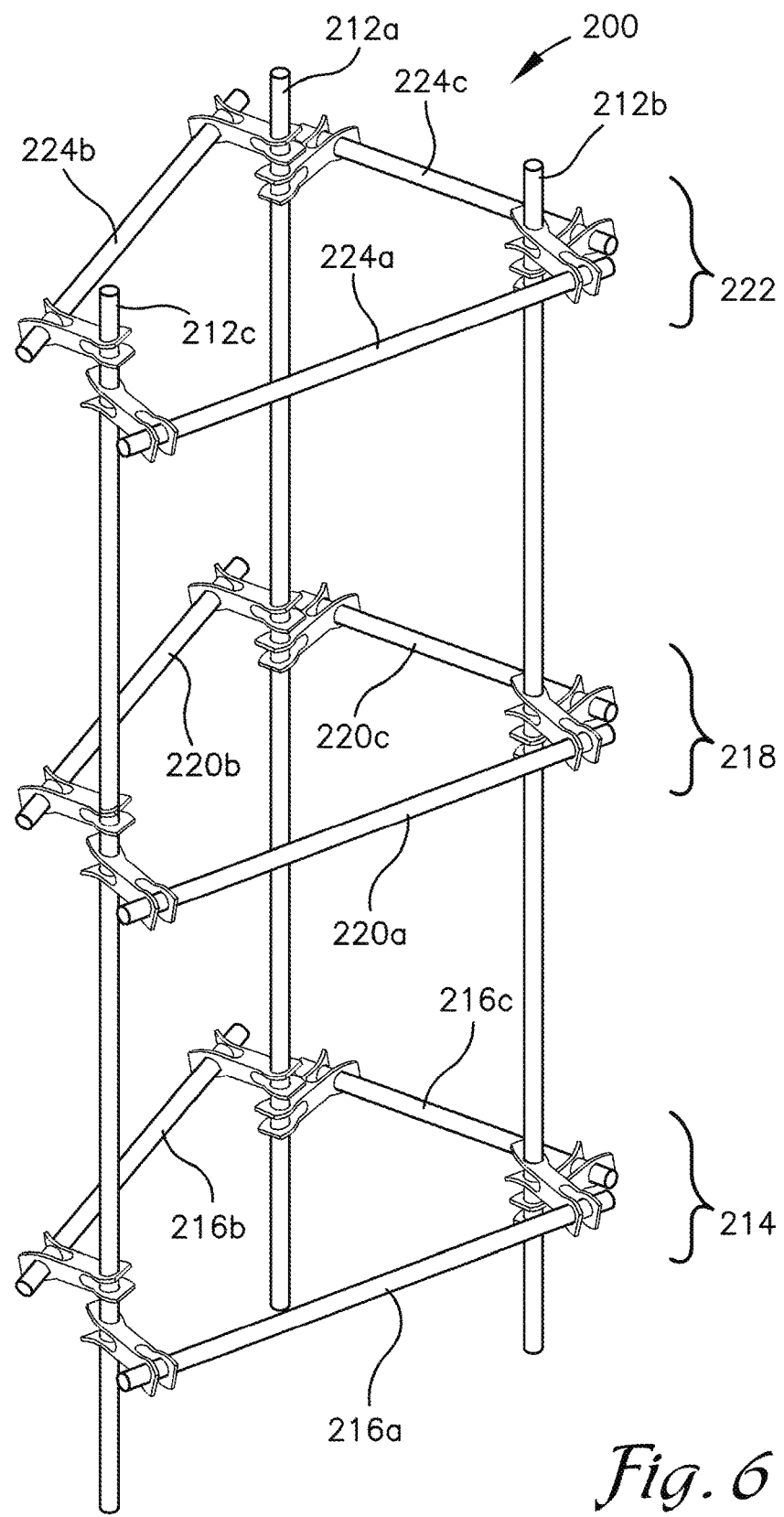
FIG. 6 is a perspective view of an alternative configuration of a plant cage in which the rods and locking clips can be assembled.

With reference to the plant cages of FIGS. 1 and 6, it will be apparent that using the locking clip and horizontal and vertical support rods of the present invention that a plant cage of virtually any size and configuration can be assembled. For example, the square cage of FIG. 1 could be replicated side-by-side and attached to the existing cage using additional locking clips. Similarly, plant cages of various shapes can be configured from a single set of horizontal and vertical support rods and locking clips.

It should be further understood that a plant cage in accordance with the present invention may include more or fewer support tiers than depicted in the exemplary embodiments. These and other variations are contemplated by and are within the scope of the present invention.

With the plant cage assembled as described above using the locking clips and horizontal and vertical supports rods of the present invention, the locking clips secure the rods so that they cannot move or slip horizontally or vertically and are essentially fixed in place until a user physically releases the clips by squeezing the tabs together. The plant cage is thus secure and rigid and resistant to deterioration by moisture, weather, sunlight, and other environmental conditions.

In further exemplary embodiments the clips can be permanently adhered to the support rods using a fiberglass glue or adhesive, such as a cyanoacrylate adhesive, after assembly into the desired configuration.

It should be understood that while certain forms and embodiments have been illustrated and described herein, the present invention is not to be limited to the specific forms or arrangement of parts described and shown, and that the various features described may be combined in ways other than those specifically described without departing from the scope of the present invention. The terms "substantially", "generally", "approximately", or any other qualifying term as used herein may be applied to modify any quantitative representation which could permissibly vary without resulting in a change to the basic function to which it is related. For example, the orientation of the clamp portions at opposite ends of the body of the locking clip are described as being orthogonal, but may permissibly vary from that configuration if the variance does not materially alter the capability of the invention.

What is claimed is:

1. A plant cage, comprising:
at least one vertical support rod;
at least one horizontal support rod;
a locking clip configured to attach said at least one horizontal support rod to said at least one vertical support rod, wherein said locking clip comprises a main body with first and second clamps at opposite ends of said main body in orthogonal relationship to each other, said first and second clamps each comprising a pair of tabs extending outwardly from said main body, said tabs movable between a deflected position and a released position, wherein each of said tabs comprises an aperture formed therethrough, and wherein said apertures on said pair of tabs are aligned concentrically when said tabs are in said deflected position and are not aligned concentrically when said tabs are in said released position.

2. The plant cage of claim 1, wherein said at least one vertical support rod extends through a pair of apertures in a pair of tabs extending from a first end of said main body, and wherein said at least one horizontal support rod extends through a pair of apertures in a pair of tabs extending from a second end of said main body.

3. The plant cage of claim 2, wherein a portion of said tabs surrounding said apertures frictionally engage said corresponding horizontal and vertical support rods extending therethrough when said tabs are in said released position.

4. The plant cage of claim 1, wherein each tab of said pair of tabs extends outwardly at an oblique angle to the other tab of said pair.

5. The plant cage of claim 1, wherein each tab comprises a detent portion at a distal end comprised to receive a finger of a user for deflecting said tab.

6. A locking clip for a plant cage assembly, comprising:
an elongated main body;
first and second clamps at opposite ends of said main body, wherein each of said clamps comprises a pair of tabs extending outwardly from said main body and wherein said first and second clamps are arranged orthogonally to each other wherein each of said tabs comprises an aperture formed therethrough, and wherein said apertures on said pair of tabs are aligned concentrically when said tabs are in a deflected position and are not aligned concentrically when said tabs are in a released position.

7. The locking clip of claim 6, wherein each tab of each pair of tabs is comprised of a resilient material such that each tab is moveable between a deflected position and a released position.

8. The locking clip of claim 7, wherein a resiliency of each tab biases said tab towards said released position when not deflected by a user.

9. The locking clip of claim 6, wherein each tab comprises a detent portion at its distal end configured to allow a user to deflect said tab.

10. The locking clip of claim 6, wherein each tab of said pair of tabs extends outwardly at an oblique angle to the other tab of said pair.

11. The locking clip of claim 6, wherein said clip comprises a fiberglass reinforced polymer material, a polyvinyl chloride material, or combinations thereof.

12. A plant cage, comprising:
a plurality of vertical support rods;
a plurality of horizontal support rods; and
a plurality of locking clips comprising a main body having first and second clamps at opposite ends, said first and second clamps each comprising a pair of extending tabs configured to attach to a rod, wherein a first clamp of each locking clip is attached to at least one of said plurality of vertical support rods and wherein a second clamp of each locking clip is attached to at least one of said plurality of horizontal support rods, wherein each of said tabs comprises an aperture formed therethrough, and wherein said apertures on said pair of tabs are aligned concentrically when said tabs are in a deflected position and are not aligned concentrically when said tabs are in a released position.

13. The plant cage of claim 12, wherein said horizontal support rods, said vertical support rods, and said apertures are cylindrical in shape.

14. The plant cage of claim 12, wherein each tab of said pair of tabs extends outwardly at an oblique angle to the other tab of said pair.

15. The plant cage of claim 12, wherein tab of each pair of tabs is comprised of a resilient material such that the tabs of the pair are moveable towards each other to a deflected position.

16. The plant cage of 15, wherein a resiliency of each tab biases the tab towards a released position when not deflected by a user.

* * * * *